(12) United States Patent
Kato et al.

(10) Patent No.: US 6,799,958 B2
(45) Date of Patent: Oct. 5, 2004

(54) INJECTION MOLDING APPARATUS

(75) Inventors: Tomohisa Kato, Aichi-ken (JP); Takashi Okano, Aichi-ken (JP)

(73) Assignee: Sakaeriken Kogyo Co., Ltd., Aichi-ken (JP)

( * ) Notice: Subject to any disclaimer, the term of this patent is extended or adjusted under 35 U.S.C. 154(b) by 0 days.

(21) Appl. No.: 10/267,473

(22) Filed: Oct. 9, 2002

(65) Prior Publication Data

US 2003/0077344 A1 Apr. 24, 2003

(30) Foreign Application Priority Data

Oct. 18, 2001 (JP) ........................................ 2001-320147
Feb. 8, 2002 (JP) ........................................ 2002-031939

(51) Int. Cl.[7] ........................... B29C 45/14; B29C 45/16
(52) U.S. Cl. ........................ 425/112; 264/513; 425/388
(58) Field of Search ................................ 264/510, 511, 264/512, 513; 425/112, 388

(56) References Cited

U.S. PATENT DOCUMENTS

| | | | | |
|---|---|---|---|---|
| 4,714,424 A | * | 12/1987 | Kinugasa et al. | 425/388 |
| 6,045,744 A | * | 4/2000 | Kobayashi et al. | 264/511 |
| 6,440,353 B1 | * | 8/2002 | Hutchins | 425/388 |

* cited by examiner

Primary Examiner—Tim Heitbrink
(74) Attorney, Agent, or Firm—Osha & May L.L.P.

(57) ABSTRACT

An injection molding apparatus for producing a plastic product having a grain pattern thereon. The apparatus includes a female die having a grain pattern on an inner surface thereof, the female die further provided with a vacuum drawing mechanism for drawing a vacuum therethrough, and a male die having an injection aperture for injecting a thermal formable plastic material therethrough. The male die further includes a burr cutter adapted to slide fit in a gap between the male die and the female die and a guide pin with a spacer provided at four corners of the male die for controlling a distance between the male die and a female die.

6 Claims, 7 Drawing Sheets

INJECTION MOLDING APPARATUS

BACKGROUND OF INVENTION

1. Field of the Invention

The present invention relates to an injection molding apparatus for producing plastic products having grain patterns thereon.

2. Background Art

Conventionally, plastic products having grained surfaces have been produced by preparing a laminate material with a grain pattern on its surface in advance, and then the laminate material is adhered using an adhesive or the like to the surface of the plastic product. However, when there are three-dimensional curved surfaces or the like on the products, this method has a problem in that the laminate material is stretched unnecessarily or that wrinkles occur around the curved surfaces. There is also a problem in that there is stretching or sagging in the grain pattern itself.

In order to solve these problems, a method for producing a plastic product having a grained surface has been proposed. According to this method, a grain pattern is formed in advance in one die, and a laminate material for creating the grain pattern is placed in this die. Under this condition, a plastic product formed in a predetermined shape and coated with adhesive is pushed against the back surface of the laminate material such that the laminate material is caused to adhere to the product. Thereafter, the laminate material is pulled by a vacuum from the die having the grain pattern thereon. However, this grained pattern fabrication process has a problem in that it takes too long.

SUMMARY OF INVENTION

In general, in one aspect, the present invention relates to an injection molding apparatus for producing a plastic product having a grain pattern thereon. The apparatus comprises a female die having a grain pattern on an inner surface thereof, the female die further provided with a vacuum drawing mechanism for drawing a vacuum therethrough, and a male die having an injection aperture for injecting a thermal formable plastic material therethrough. The male die comprises a burr cutter adapted to slide fit in a gap between the male die and the female die and a guide pin with a spacer provided at four corners of the male die for controlling a distance between the male die and a female die.

Other aspects and advantages of the invention will be apparent from the following description and the appended claims.

DETAILED DESCRIPTION

Figure 1:
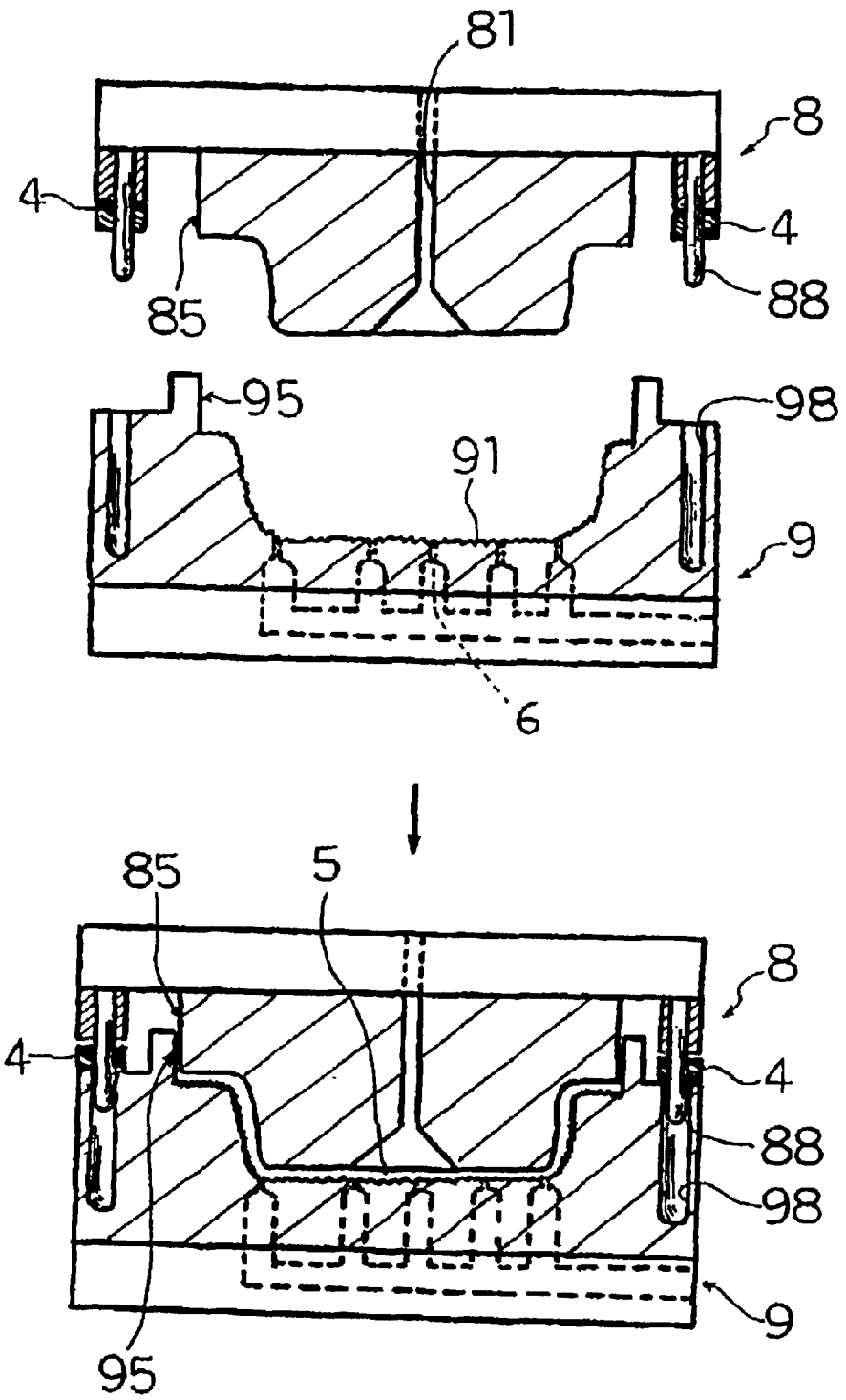
FIG. 1 is a cross-sectional view of the injection molding apparatus according to an embodiment of the present invention.

Referring now to the drawings, the present invention is explained in detail.

Figure 2:
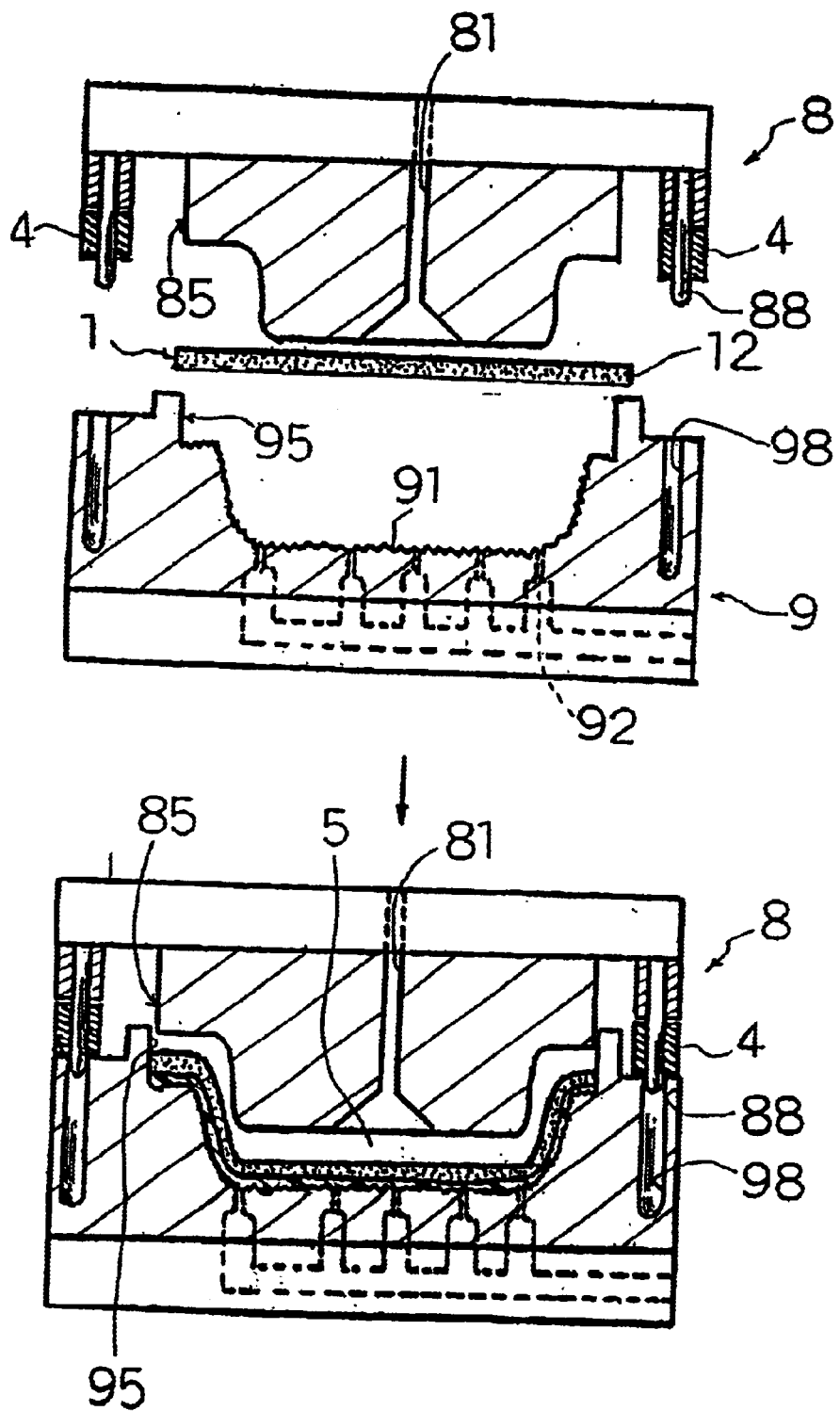
FIG. 2 is a cross-sectional view of the injection molding apparatus according to an embodiment of the present invention.

In one embodiment, the injection molding apparatus of the present invention comprises a male die 8 and a female die 9 as shown in FIGS. 1 and 2. The male die 8 is provided with an injection aperture 81 for injecting a thermal formable plastic material therethrough. The outer periphery of the male die 8 is equipped with a vertical burr cutter part 85 adapted to slide fit in a gap between the male die 8 and the female die 9. In the four corners of the male die 8, there are guide pins 88 that slide while fitting with the guide groove 98 that is provided on the female die 9. Spacers 4 are provided adjacent to the guide pins 88. Volume of a cavity space 5 as shown in FIG. 1 can be controlled by adjusting the thickness (height) of the spacers 4. In a case where a cushion layer 12 is attached to the back surface of the laminate material 1 as shown in FIG. 2, the cavity space 5 formed at the back surface side can be adjusted and optimized to the height of the cushion layer 12.

In a case where no cushion layer is attached on the back surface of the laminate material 1, the laminate material 1 is fabricated to have a specific grain pattern on the front surface of the laminate material 1 by drawing a vacuum through vacuum drawing mechanism 6, as for example shown in FIG. 1. In this state, the spacers 4, equipped adjacent to the guide pins 88, are adjusted optimally to control the volume of the cavity space 5. Injection molding is performed through the injection part 81 of the male die 8 immediately after adjusting the spacers 4. By doing this, laminating and integrating the grain-patterned laminate material with the plastic substrate can be performed promptly. As a result, efficient manufacturing of grain-patterned plastic product can be achieved.

In a case where there is a cushion layer 12 on the back surface of the laminate material 1, as for example shown in FIG. 2, the spacers 4 are adjusted appropriately after drawing a vacuum, and a predetermined amount of plastic material is injected at a low pressure through an injection aperture 81 formed on the male die 8 into the cavity space 5. Then, in this state, the male die 8 is gradually moved forward such that the laminate material 1 is laminated and integrated with the injected plastic material. By doing this, a plastic product with a grain pattern which has been transferred from the grain pattern on the female die 9 is fabricate efficiently.

According to the present invention, plastic products having a laminate material of various kinds, such as the one having different thickness of the cushion layer 12 disposed on the back surface thereof or the one having no cushion layer, can be efficiently produced, while using the same male die 8 and female die 9. Namely, while using the same male die 8 and female die 9, the space in the cavity 5 can be appropriately controlled by adjusting the spacers 4 equipped adjacent to the guide pins 88. By doing this, it becomes possible to meet the request of specification changes of the plastic product, without replacing the male die 8 and female die 9. Consequently, overall productivity is significantly improved.

The female die 9 is provided with a specific grain pattern 91 on its inner surface and vacuum drawing mechanism 6 for drawing a vacuum therethrough. The specific structure will be explained by referring to FIGS. 1 through 7.

Firstly, the female die 9 is fabricated from cast steel, and a desired grain pattern 91, as shown in FIGS. 1 to 6, is formed by etching on an inner surface thereof. By doing this, even when a need for changing a part of the shape of the plastic product arises, it becomes possible to meet the request for changes by machining off a apertureion of the die 8 or 9 or performing a welding fillet process on the dies 8 and 9, and then re-etching the surface parts thus formed.

Figure 7:
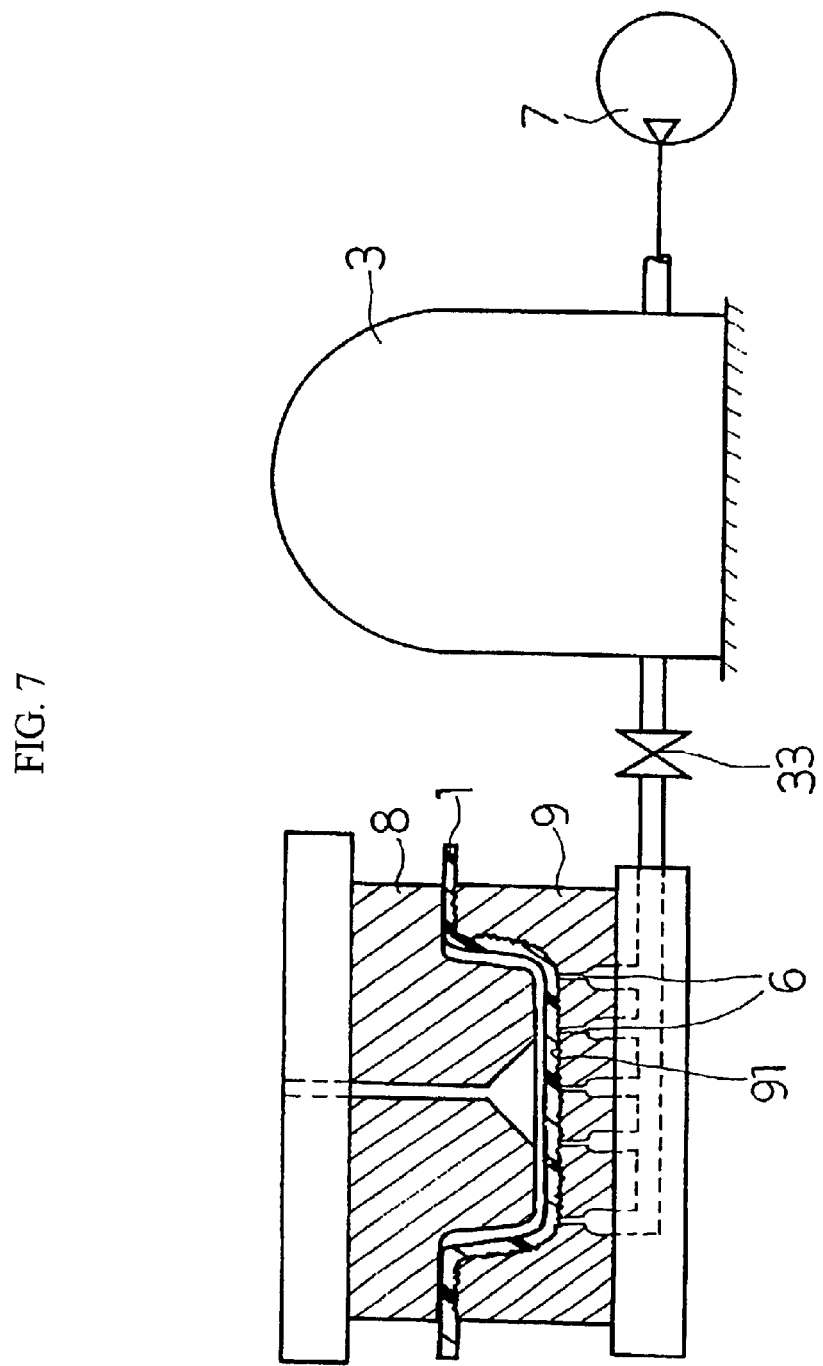
FIG. 7 is a schematic drawing showing the structure of the entire vacuum draw down apparatus according to an embodiment of the present invention.

The inner surface of the female die 9 is provided with vacuum drawing mechanism 6 for drawing a vacuum. The vacuum drawing mechanism is connected to a vacuum pressure supply device as shown in FIG. 7, which includes a vacuum pump 7 through a duct, tube, or the like. This vacuum pressure supply device is used to draw the laminate material 1 against the grain pattern 91 that is provided on an inner surface of the female die 9, making it possible to transfer the grain pattern 91 to the outside surface of the laminate material 1.

Figure 3:
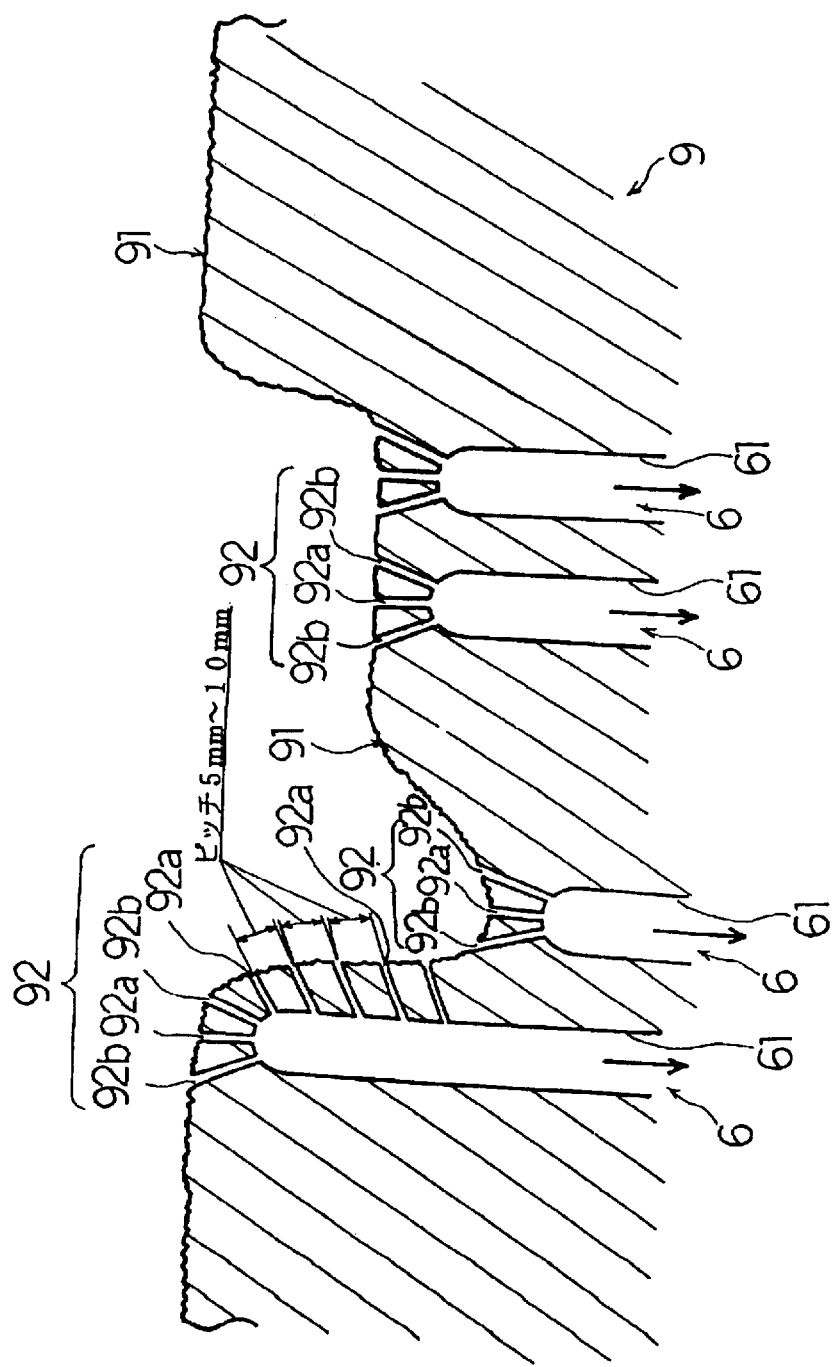
FIG. 3 is a cross-sectional view of the female die according to an embodiment of the present invention.
Figure 4:
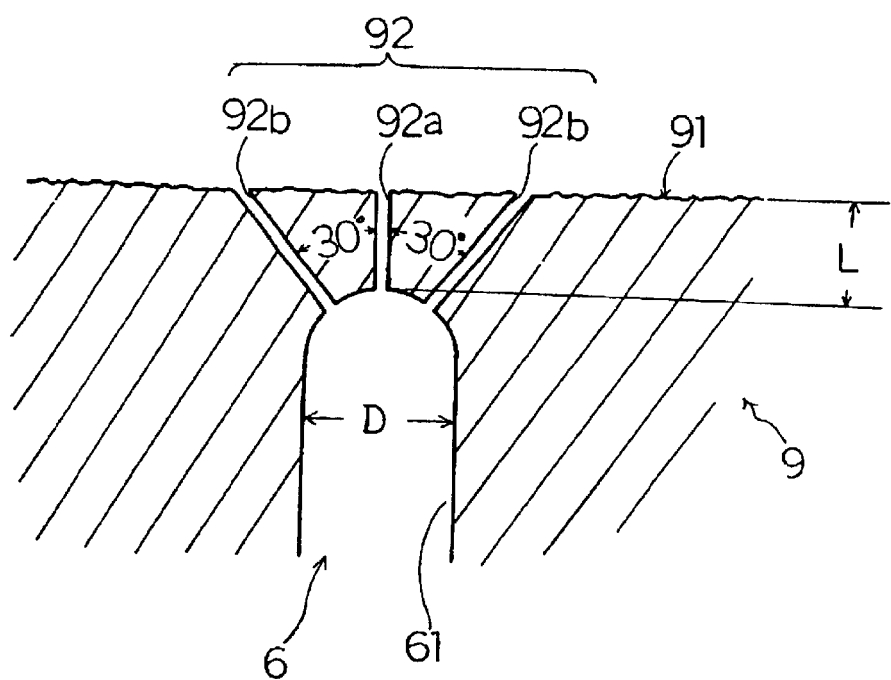
FIG. 4 is a cross-sectional expanded partial view of the female die according to an embodiment of the present invention.

Next, structure of the vacuum drawing mechanism 6 will be explained in detail by referring to FIGS. 3 through 6. Firstly, as shown in FIG. 3, a grain pattern 91 is provided nearly uniformly across the entire inner surface of the female die 9. This female die 9 is connected to the vacuum tank 3 shown in FIG. 7 through a valve 33. The vacuum drawing mechanism 6 includes approach holes 61 provided in a direction that is perpendicular to the reference plane of the female die 9. As shown in FIGS. 3 and 4, this vacuum drawing mechanism 6 is provided upright, an inner diameter (D) of which is 5–10 mm. Each of the vacuum drawing mechanism comprises an approach hole 61 and a minute hole 92. The approach holes 61 are provided such that the tip end of the approach holes 61 reach a position that is 5–10 mm distant from the inner surface of the female die 9. The minute holes 92 are provided in straight lines from the top end apertureion of the approach holes 61 through the inner surface of the female die, as shown in FIGS. 3 and 4. Internal diameters of the minute holes is about 0.3 mm.

Figure 5:
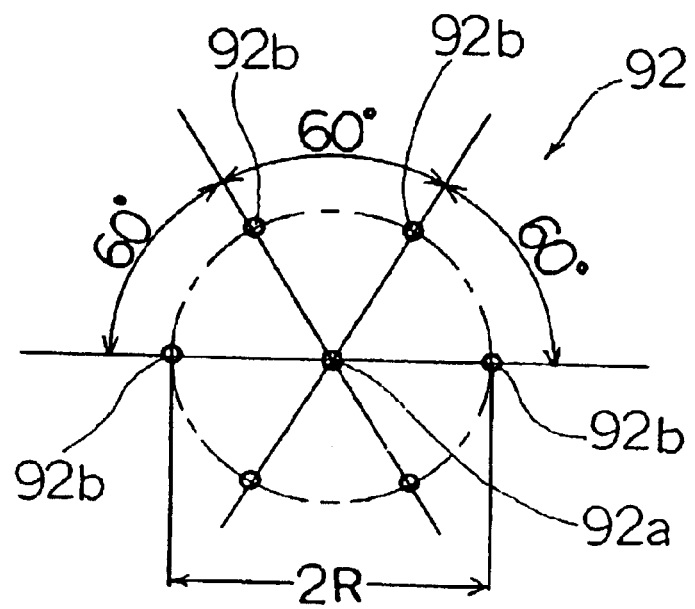
FIG. 5 is a top view of fine holes for drawing a vacuum according to an embodiment of the present invention.
Figure 6:
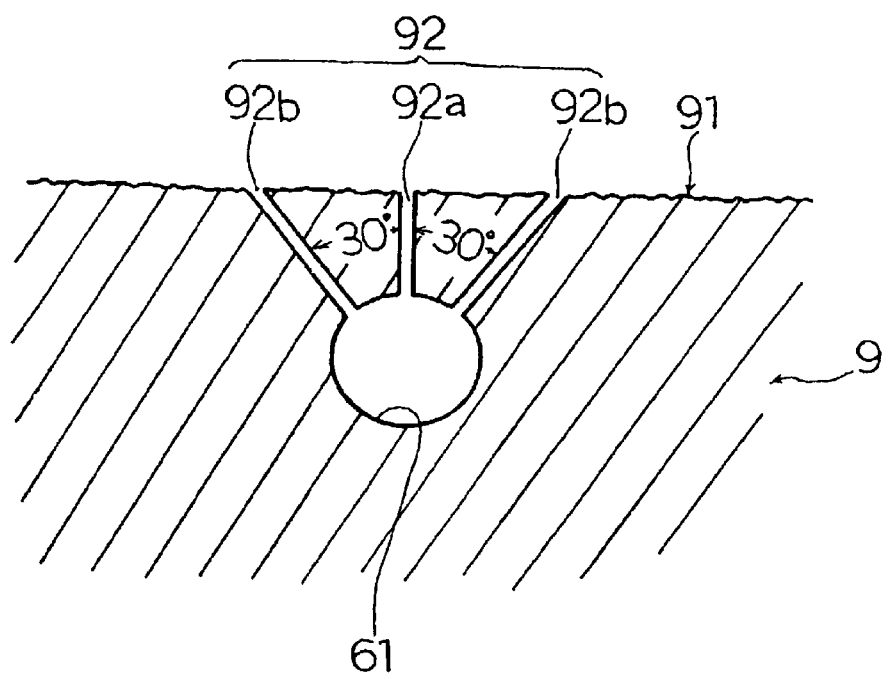
FIG. 6 is a cross-sectional expanded partial view of the female die according to an embodiment of the present invention.

As shown in FIGS. 4 and 5, the minute holes 92 provided primarily in the flat surface part of the inner surface of the female die 9 comprise fine holes 92a and fine holes 92b. The fine holes 92a are provided in a perpendicular direction with respect to the inner surface of the female die 9. The fine holes 92b are provided around the fine hole 92a with tilted angles of about 30° from the fine hole 92a, as shown in FIG. 4. As shown in FIG. 5, the openings of these fine holes 92a and 92b for vacuum drawing are laid out on the inner surface of the female die 9 such that a fine hole 92a is disposed in the center of a circle and fine holes 92b are disposed in six locations on the circle around the fine hole 92a, each of them 5–10 mm equally distant from the fine hole 92a. The group of minute holes 92 comprises a set of seven openings (one fine hole 92a and six fine holes 92b) as described above. They are provided nearly uniformly across the entire flat part of the inner surface of the female die 9.

As shown in FIG. 3, the minute holes 92 are provided through the inner surface of the female die 9 approximately perpendicularly to the vertical wall surfaces or tilted surfaces of the female die 9. As more specifically shown in FIG. 6, fine hole 92a is provided through the female die 9 approximately perpendicularly to the inner surface of the female die 9. The fine holes 92b are provided through the female die 9 in a manner that the passage of the fine holes 92b are tilted approximately 30° with respect to the passage of the fine hole 92a. The openings of these fine holes 92a and 92b on the inner surface of the female die 9 are provided across the entire vertical wall surfaces or slanted surfaces, each separated apart about 5 mm. The vacuum drawing mechanism is structured such that the distance from the approach hole 6 to the grain-patterned inner surface of the female die 9 is not too long. In this embodiment, the distance is about 5–10 mm. By forming the minute holes 92 at nearly perpendicular angles to the inner surface of the female die 9 even on the vertical wall surfaces and the slanted surfaces and forming the distance of the passage of the minute holes 92 relatively short, vacuum pressure supplied to the minute holes 92 will work uniformly across the surface of the laminate material 1 without being attenuated. As a result, a uniform grain pattern will be produced without sagging, etc., even on a three-dimensional curved surface.

The vacuum supply device that supplies the vacuum pressure to the vacuum drawing mechanism 6 comprises a vacuum pump 7, a vacuum tank 3 with a predetermined volume, and a valve 33 that releases the vacuum pressure (vacuum level) accumulated in the vacuum tank 3. This valve 33 is connected through ducts, tubes, or the like, to the vacuum drawing mechanism 6 that comprise the approach holes 61 so as to provide the vacuum pressure (vacuum level) through the approach holes 61 to the respective minute holes 92 for drawing a vacuum. Note that in the present example embodiment, a vacuum level (vacuum pressure) is −680 mmHg to −760 mmHg is provided as the vacuum state that is accumulated in the aforementioned vacuum tank 3. Note that the vacuum thank 3 has a capacity able to draw a vacuum in the dies 8 and 9, a capacity which, in most cases, is 12 to 15 times the value corresponding to the capacity of the female die 9. In the present example embodiment, a vacuum tank 3 with a capacity of 300 liters was used.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An injection molding apparatus for producing a plastic product having a grain pattern thereon, the apparatus comprising:

a female die having a grain pattern on an inner surface thereof, the female die further provided with a vacuum drawing mechanism for drawing a vacuum therethrough; and a male die having an injection aperture for injecting a thermal formable plastic material therethrough, the male die comprising a burr cutter adapted to slide fit in a gap between the male die and the female die and a guide pin with an adjustable spacer provided at four corners of the male die for controlling a distance between the male die and the female die.

2. The injection molding apparatus according to claim 1, wherein the vacuum drawing mechanism comprises an approach hole provided on a bottom surface of the female die and a minute hole connected to the approach hole and extending through the inner surface of the female die.

3. The injection molding apparatus according to claim 2, wherein each of the minute holes comprises one fine hole and six other fine holes surrounding the fine hole in a circular arrangement.

4. The injection molding apparatus according to claim 3, wherein the fine holes are formed on the inner surface of the female die in a manner that the fine holes are evenly distributed across the inner surface of the female die.

5. The injection molding apparatus according to claim 3, wherein the fine holes are formed perpendicularly to the inner surface of the female die.

6. The injection molding apparatus according to claim 1, wherein the female die is formed of a cast steel, and a grain pattern is formed on the inner surface of the female die by etching.

* * * * *